US010327432B2

(12) United States Patent
Ahmad (10) Patent No.: US 10,327,432 B2
(45) Date of Patent: Jun. 25, 2019

(54) DUAL-BEARING REEL AND LEVEL WIND MECHANISM THEREOF

(71) Applicant: Shimano Components (Malaysia) SDN. BHD., Pontian, Johor (MY)

(72) Inventor: Abu Supian Bin Ahmad, Johor (MY)

(73) Assignee: SHIMANO COMPONENTS (MALAYSIA) SDN. BHD., Pontian, Johor (MY)

( * ) Notice: Subject to any disclaimer, the term of this patent is extended or adjusted under 35 U.S.C. 154(b) by 181 days.

(21) Appl. No.: 15/413,585

(22) Filed: Jan. 24, 2017

(65) Prior Publication Data

US 2017/0238516 A1    Aug. 24, 2017

(30) Foreign Application Priority Data

Feb. 23, 2016  (JP) ................................. 2016-032155

(51) Int. Cl.
| | |
|---|---|
| *A01K 89/01* | (2006.01) |
| *A01K 89/015* | (2006.01) |
| *A01K 87/06* | (2006.01) |
| *A01K 89/00* | (2006.01) |
| *F16H 53/08* | (2006.01) |
| *F16J 15/32* | (2016.01) |
| *F16J 15/43* | (2006.01) |
| *F16J 15/447* | (2006.01) |

(52) U.S. Cl.
CPC ........ *A01K 89/01916* (2015.05); *A01K 87/06* (2013.01); *A01K 89/006* (2013.01); *A01K 89/0186* (2015.05); *A01K 89/01928* (2015.05); *F16H 53/08* (2013.01); *F16J 15/32* (2013.01); *F16J 15/43* (2013.01); *F16J 15/447* (2013.01)

(58) Field of Classification Search
CPC .......... A01K 89/015; A01K 89/019125; A01K 89/01915; A01K 89/01916; A01K 89/01928; A01K 89/1093
See application file for complete search history.

(56) References Cited

U.S. PATENT DOCUMENTS

| | | | | |
|---|---|---|---|---|
| 2,523,133 A | * | 9/1950 | Maynes ........... | A01K 89/01916 242/274 |
| 2002/0096587 A1 | * | 7/2002 | Ikuta ...................... | A01K 89/00 242/319 |

(Continued)

FOREIGN PATENT DOCUMENTS

JP    2013243997 A    12/2013

*Primary Examiner* — Emmanuel M Marcelo
(74) *Attorney, Agent, or Firm* — United IP Counselors, LLC (57) ABSTRACT

A level wind mechanism for a dual-bearing reel including a first reel body and a second reel body includes a worm shaft, a guide member, and a first seal member. The worm shaft including a first end, a second end, a shaft body and a helical groove. The first end is on the same side as the first reel body. The second end is on the same side as the second reel body. The shaft body extends between the first end and the second end. The helical groove is on the shaft body. The guide member includes a tubular shape, is outside the worm shaft in a radial direction from a rotational axis of the worm shaft, and extends between the first reel body and the second reel body. The first seal member seals between the first end of the worm shaft and the guide member.

18 Claims, 5 Drawing Sheets

(56) References Cited

U.S. PATENT DOCUMENTS

| | | | |
|---|---|---|---|
| 2006/0006267 A1* | 1/2006 | Hirayama | A01K 89/0192 242/223 |
| 2012/0048981 A1* | 3/2012 | Ohara | A01K 89/0108 242/230 |
| 2015/0115088 A1* | 4/2015 | Toma | A01K 89/01928 242/283 |
| 2016/0106083 A1* | 4/2016 | Niitsuma | A01K 89/0192 242/310 |

* cited by examiner

DUAL-BEARING REEL AND LEVEL WIND MECHANISM THEREOF

CROSS-REFERENCE TO RELATED APPLICATIONS

This application claims priority to Japanese Patent Application No. 2016-032155 filed on Feb. 23, 2016, the entirety of which is hereby incorporated by reference in its entirety.

BACKGROUND

Technical Field

The present disclosure relates to a dual-bearing reel and a level wind mechanism thereof.

Background Information

Dual-bearing reels generally include a level wind mechanism. For example, as described in Japan Laid-open Patent Application Publication No. 2013-243997, a dual-bearing reel includes a level wind mechanism in order to evenly wind a fishing line about a spool.

The level wind mechanism includes a worm shaft, a guide member and a slide member. The worm shaft and the guide member extend between a first reel body and a second reel body. The guide member has a tubular shape and the worm shaft extends inside the guide member. The worm shaft is provided with a helical groove thereon. The slide member reciprocates on the guide member along the helical groove of the worm shaft.

As described above, the worm shaft and the guide member extend between the first reel body and the second reel body. Therefore, water might intrude into the first reel body through a gap between the worm shaft and the guide member.

BRIEF SUMMARY

It is an object of the present disclosure to inhibit intrusion of water into the first reel body.

A level wind mechanism according to a first aspect of the present disclosure is for a dual-bearing reel including a first reel body and a second reel body. The level wind mechanism includes a worm shaft, a guide member and a first seal member. The worm shaft includes a first end, a second end, a shaft body and a helical groove. The first end is disposed on the same side of the reel unit as the first reel body. The second end is disposed on the same side of the reel unit as the second reel body. The shaft body extends between the first end and the second end. The helical groove is provided on the shaft body. The guide member is disposed outside the worm shaft in a radial direction of the worm shaft. The guide member has a tubular shape and extends between the first reel body and the second reel body. The first seal member seals between the first end of the worm shaft and the guide member.

According to this construction, the first seal member seals between the first end of the worm shaft and the guide member. Therefore, it is possible to inhibit intrusion of water into the first reel body through a gap between the worm shaft and the guide member.

The first seal member can be an elastic member provided with a lip. The lip contacts an outer peripheral surface of the worm shaft.

The level wind mechanism can further include a second seal member. The second seal member seals between the guide member and the first reel body. According to this construction, the second seal member can inhibit intrusion of water into the first reel body through the gap between the guide member and the first reel body.

The second seal member can be an O-ring.

The worm shaft can be provided with a recess on the first end of the worm shaft. The recess has an annular shape and extends in a circumferential direction of the worm shaft. Additionally, the first seal member contacts the worm shaft within the recess. According to this construction, the first seal member can be disposed without increasing the gap between the worm shaft and the guide member. Additionally, the recess of the worm shaft, which the first seal member contacts, has a smaller diameter than other parts of the worm shaft. Therefore, it is possible to reduce a rotational resistance acting on the worm shaft from the first seal member. Moreover, a labyrinth structure is produced by the recess. Hence, this can further enhance the waterproofing performance of the level wind mechanism.

A dual-bearing reel according to a second aspect of the present disclosure includes a reel unit, a handle, a spool, a rotation transmission mechanism, a worm shaft, a guide member and a first seal member. The reel unit includes a first reel body and a second reel body. The handle is attached to the first reel body. The spool is disposed between the first reel body and the second reel body. The rotation transmission mechanism is disposed inside the first reel body. The rotation transmission mechanism transmits a rotation of the handle to the spool. The worm shaft includes a first end, a second end, a shaft body and a helical groove. The first end is disposed on the same side of the reel unit as the first reel body. The second end is disposed on the same side of the reel unit as the second reel body. The shaft body extends between the first end and the second end. The helical groove is provided on the shaft body. The guide member is disposed outside the worm shaft in a radial direction of the worm shaft. The guide member has a tubular shape and extends between the first reel body and the second reel body. The first seal member seals between the first end of the worm shaft and the guide member.

According to the present disclosure, intrusion of water into the first reel body can be inhibited.

BRIEF DESCRIPTION OF THE DRAWINGS

Referring now to the attached drawings which form a part of this original disclosure.

DETAILED DESCRIPTION OF EMBODIMENTS

Figure 1:
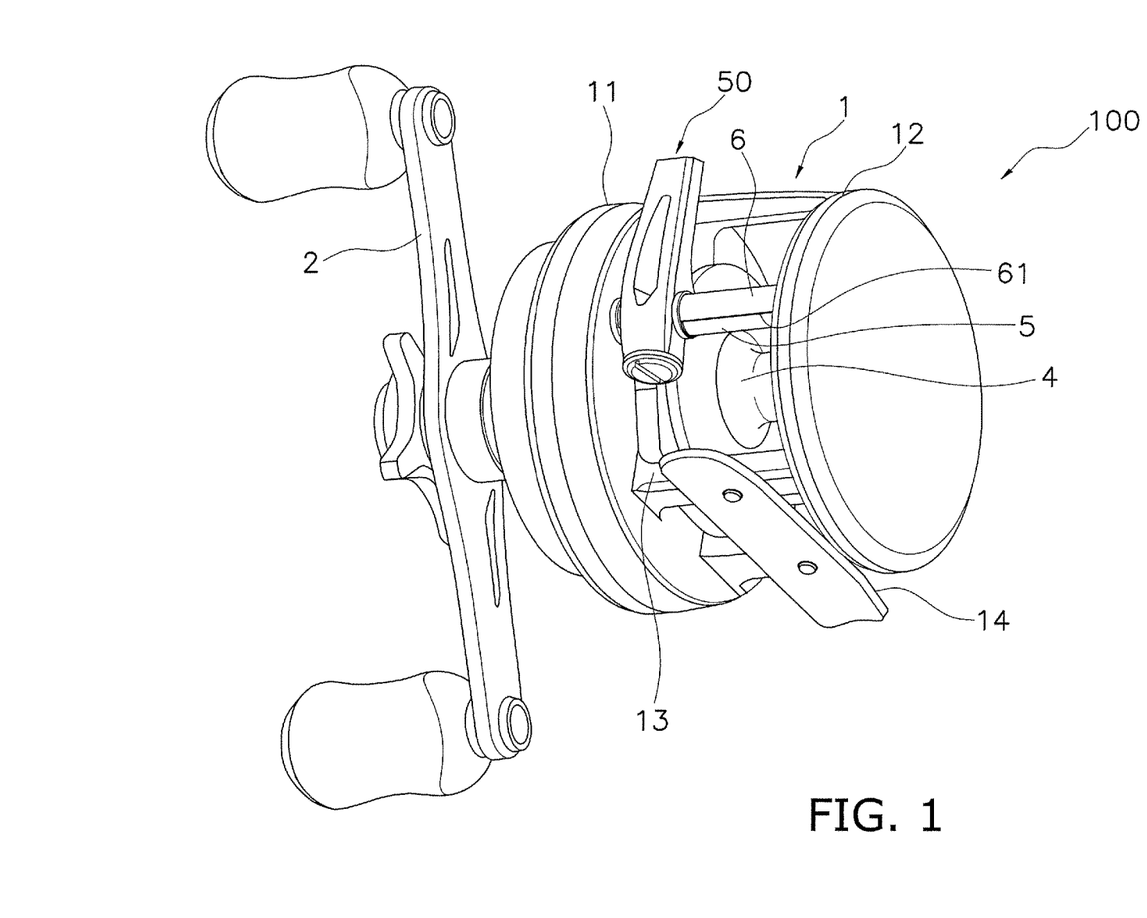
FIG. 1 is a perspective view of a dual-bearing reel.
Figure 2:
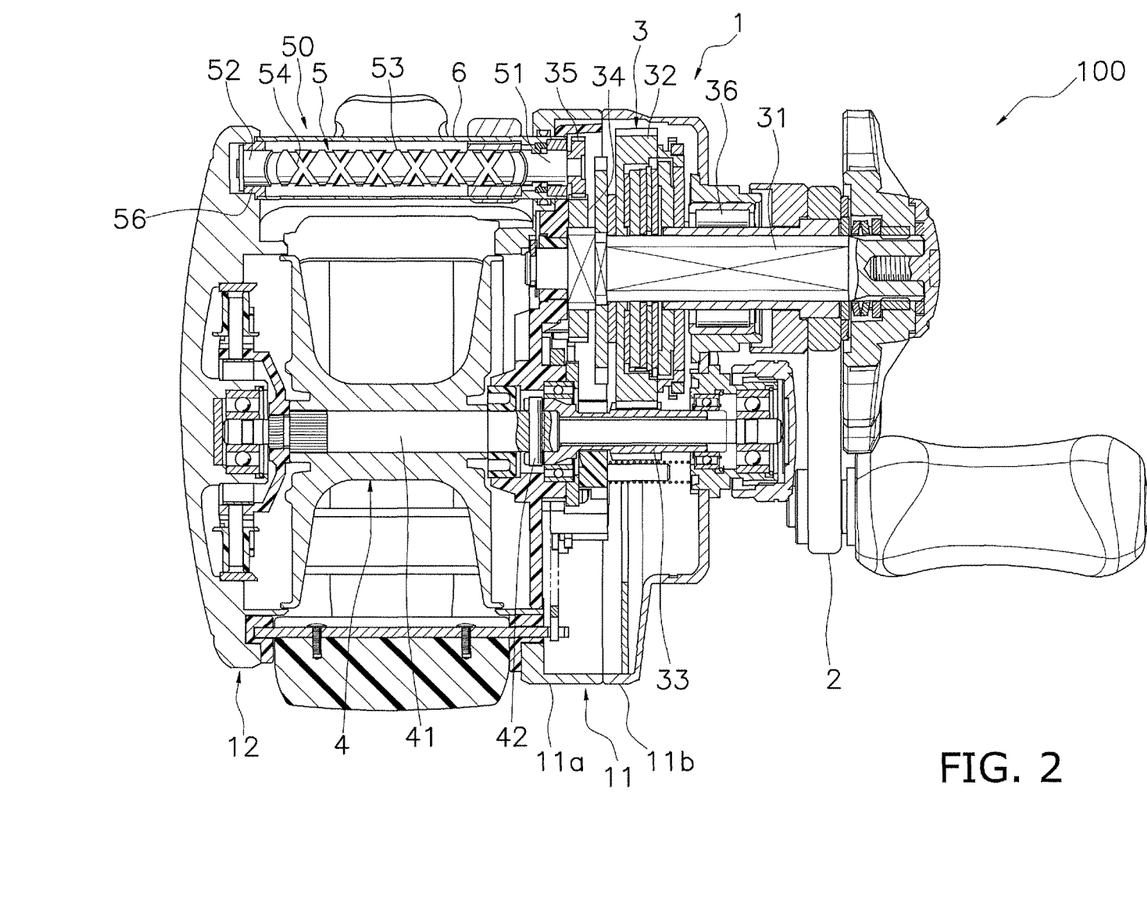
FIG. 2 is a cross-sectional view of the dual-bearing reel.

A preferred embodiment of a dual-bearing reel including a level wind mechanism according to the present disclosure will be hereinafter explained with reference to the attached drawings. FIG. 1 is a perspective view of the dual-bearing reel including the level wind mechanism, whereas FIG. 2 is a cross-sectional view of the dual-bearing reel. It should be noted that in the following explanation, the term "radial direction" means the radial direction of an imaginary circle about a rotational axis of a worm shaft 6. Moreover, the term "circumferential direction" means the circumferential direction of the imaginary circle about the rotational axis of the worm shaft 5.

<Dual-Bearing-Reel>

As shown in FIGS. 1 and 2, a dual-bearing reel 100 according to the present preferred embodiment releases a fishing line in a forward direction (in an up-left direction in FIG. 1). The dual-bearing reel 100 includes a reel unit 1, a handle 2, a rotation transmission mechanism 3, a spool 4 and a level wind mechanism 50.

<Reel Unit>

As shown in FIG. 1, the reel unit 1 includes a first reel body 11 and a second reel body 12. Additionally, the reel unit 1 includes a plurality of coupling portions 13 and a mount portion 14. The first reel body 11 and the second reel body 12 are disposed apart at an interval in the axial direction. As shown in FIG. 2, the first reel body 11 and the second reel body 12 support a spool shaft 41.

The first reel body 11 includes a first side plate 11a and a first cover 11b. The first cover 11b is attached to the first side plate 11a. The first side plate 11a and the first cover 11b produce an internal space of the first reel body 11. The rotation transmission mechanism 3 is disposed in the internal space of the first reel body 11.

As shown in FIG. 1, the coupling portions 13 couple the first reel body 11 and the second reel body 12. The mount portion 14 extends in the back-and-forth direction, and can be attached to a fishing rod. At least one of the coupling portions 13 is fixed to the mount portion 14.

<Handle>

As shown in FIG. 2, the handle 2 is rotatably attached to the outer surface of the first reel body 11. When the handle 2 is operated and rotated, the spool 4 and the level wind mechanism 50 are driven through the rotation transmission mechanism 3.

<Rotation Transmission Mechanism>

The rotation transmission mechanism 3 (transmission) transmits a rotation of the handle 2 to the spool 4. Additionally, the rotation transmission mechanism 3 also transmits the rotation of the handle 2 to the level wind mechanism 50. When described in detail, the rotation transmission mechanism 3 transmits the rotation of the handle 2 to the worm shaft 5. The rotation transmission mechanism 3 is disposed inside the first reel body 11. The rotation transmission mechanism 3 includes a drive shaft 31, a drive gear 32, a pinion gear 33, a first gear 34 and a second gear 35.

The drive shaft 31 is coupled to the handle 2 and is unitarily rotated with the handle 2. It should be noted that the drive shaft 31 is prevented from rotating in a fishing-line releasing direction by a one-way clutch 36. The drive gear 32 is mounted to the drive shaft 31 and is unitarily rotated with the drive shaft 31. The pinion gear 33 is meshed with the drive gear 32. It should be noted that the pinion gear 33 has a tubular shape. The first gear 34 is mounted to the drive shaft 31 and is unitarily rotated with the drive shaft 31. The second gear 35 is meshed with the first gear 34.

<Spool>

The spool 4 is disposed between the first reel body 11 and the second reel body 12. The fishing line is wound onto the outer peripheral surface of the spool 4. The spool 4 is fixed to the spool shaft 41 and is unitarily rotated with the spool shaft 41.

<Spool Shaft>

The spool shaft 41 is rotatably supported by the first reel body 11 and the second reel body 12 through a plurality of bearing members. One end of the spool shaft 41, disposed on the same side as the first reel body 11, penetrates and protrudes out of the pinion gear 33. The spool shaft 41 is engaged with the pinion gear 33 through a clutch mechanism. When the clutch mechanism is switched into a clutch-on state, the spool shaft 41 and the pinion gear 33 are engaged with each other and become unitarily rotatable. Contrarily when the clutch mechanism is switched into a clutch-off state, the spool shaft 41 and the pinion gear 33 are disengaged from each other and become rotatable independently from and relatively to each other. When described in detail, the pinion gear 33 is engaged with or disengaged from the spool shaft 41 through an engaging pin 42 penetrating the spool shaft 41. When moved to the left side in FIG. 2, the pinion gear 33 is engaged with the engaging pin 42. Contrarily when moved to the right side in FIG. 2, the pinion gear 33 is disengaged from the engaging pin 42.

<Level Wind Mechanism>

Figure 3:
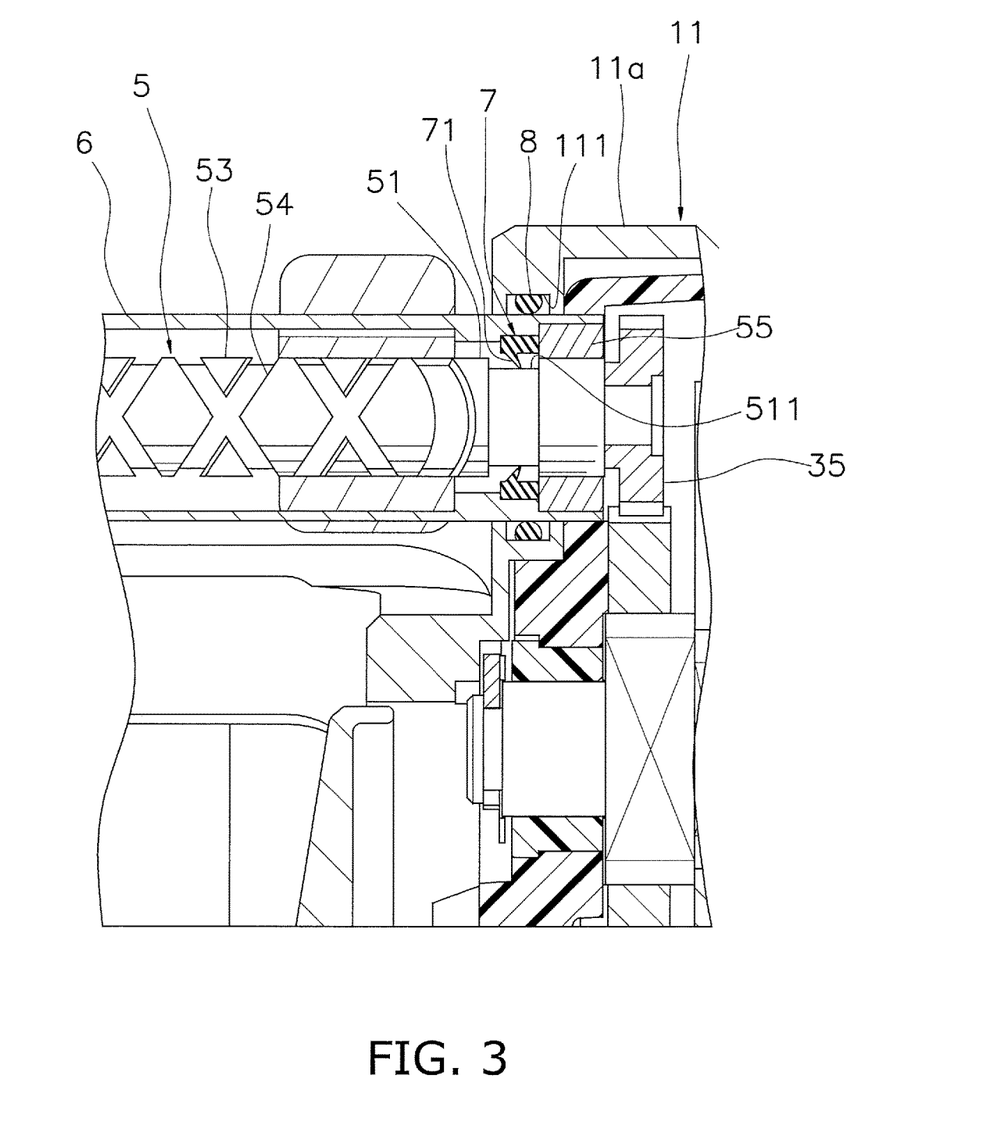
FIG. 3 is an enlarged view of a first end of a worm shaft and its periphery.
Figure 4:
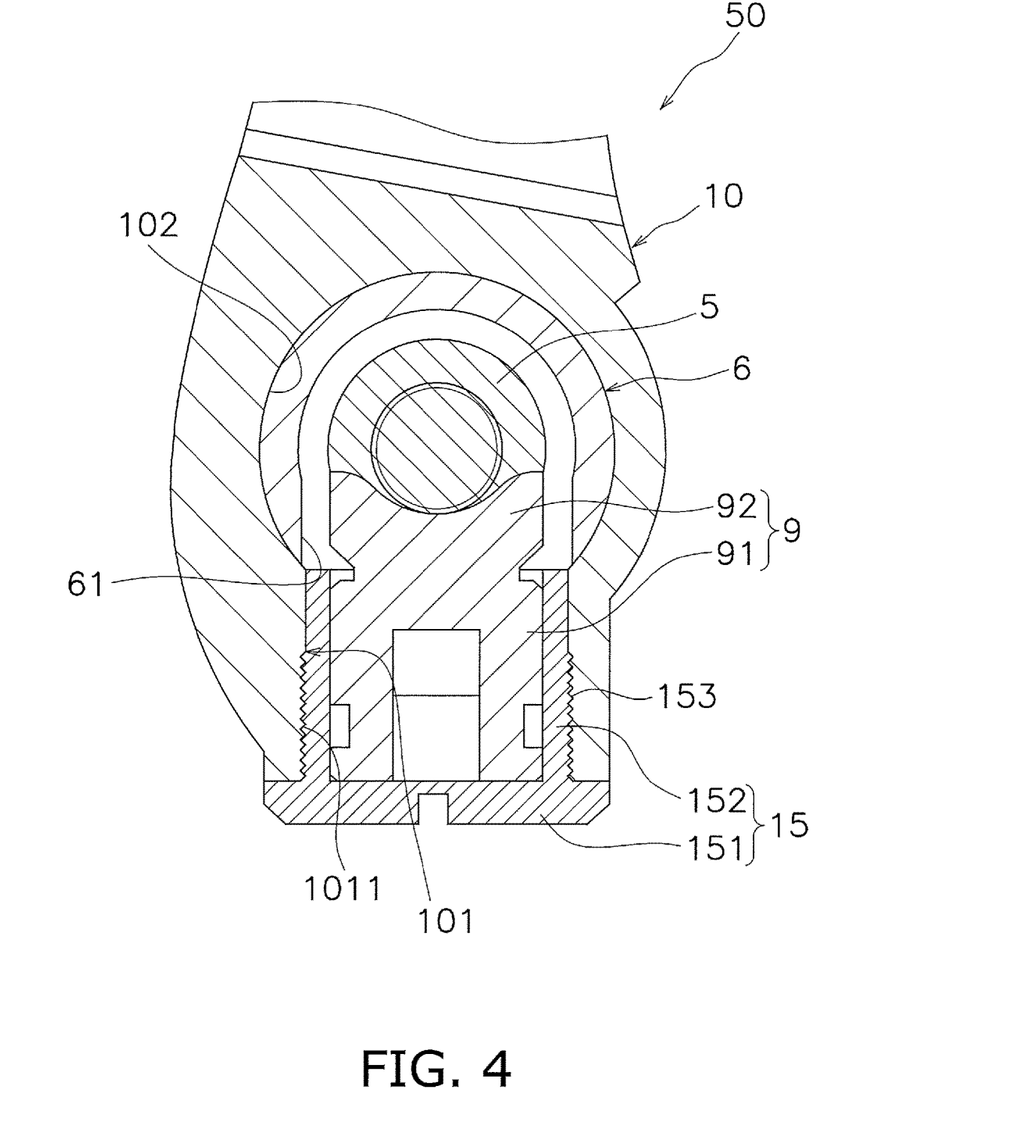
FIG. 4 is a cross-sectional view of a level wind mechanism.

The level wind mechanism 50 is a mechanism that reciprocates for uniformly winding the fishing line onto the spool 4. As shown in FIGS. 3 and 4, the level wind mechanism 50 includes the worm shaft 5, a guide member 6, an engaging member 9, a first seal member 7 and a second seal member 8. Additionally, the level wind mechanism 50 includes a slide member 10 and a plug member 15.

<Worm Shaft>

As shown in FIG. 2, the worm shaft 5 includes a first end 51, a second end 52, a shaft body 53 and a helical groove 54. The worm shaft 5 has a columnar shape. The worm shaft 5 extends substantially in parallel to the spool shaft 41. The worm shaft 5 extends between the first reel body 11 and the second reel body 12.

As shown in FIG. 3, the first end 51 is one end of the worm shaft 5 and is disposed on the same side of the reel unit 1 as the first reel body 11. The first end 51 extends inside the first reel body 11. The first end 51 is provided with a recess 511 that annularly extends in the circumferential direction. The recess 511 extends on the outer peripheral surface of the first end 51 in the circumferential direction. The recess 511 is an example of a seal enhancing means. The first end 51 is rotatably supported by the first reel body 11. The first end 51 can be supported by the first reel body 11 by a bearing member 55 made in the form of a bushing or so forth.

The aforementioned second gear 35 is mounted to the first end 51. The worm shaft 5 is unitarily rotatable with the second gear 35. The worm shaft 5 is rotated in conjunction with rotation of the handle 2. When described in detail, the second gear 35 is rotated through the drive shaft 31 and the first gear 34 in conjunction with a rotation of the handle 2, and thereby, the worm shaft 5 is rotated.

As shown in FIG. 2, the second end 52 is the other end of the worm shaft 5 and is disposed on the same side of the reel unit 1 as the second reel body 12. The second end 52 is rotatably supported by the second reel body 12. The second end 52 can be supported by the second reel body 12 through a bearing member 56 made in the form of a bushing or so forth.

The shaft body 53 extends between the first end 51 and the second end 52. The helical groove 54 is provided on the outer peripheral surface of the shaft body 53. Additionally, the helical groove 54 is not provided on the outer peripheral surface of the first end 51 and that of the second end 52.

<Guide Member>

The guide member 6 is a member for guiding the slide member 10. The guide member 6 has a cylindrical shape and is disposed radially outside the worm shaft 5. In other words, the worm shaft 5 axially extends inside the guide member 6.

The guide member 6 extends substantially in parallel to the worm shaft 5. Additionally, the guide member 6 extends between the first reel body 11 and the second reel body 12. A first end of the guide member 6 is supported by the first reel body 11. When described in detail, the first end of the guide member 6 penetrates the first side plate 11a of the first reel body 11. On the other hand, a second end of the guide member 6 is supported by the second reel body 12.

As shown in FIGS. 1 and 4, the guide member 6 includes a window 61. The window 61 enables the engaging member 9 to be engaged with the helical groove 54. The window 61 is provided in the guide member 6 along the lengthwise direction of the guide member 6. In other words, the window 61 is provided in the guide member 6 along the worm shaft 5. In use of the dual-bearing reel 100, the window 61 opens downward.

<First Seal Member>

As shown in FIG. 3, the first seal member 7 seals between the first end 51 of the worm shaft 5 and the guide member 6. The first seal member 7 is an example of a sealing means. The first seal member 7 has an annular shape and is attached to the inner peripheral surface of the guide member 6. The first seal member 7 is restricted from moving in the axial direction (i.e., toward the second reel body 12) by a step provided on the inner peripheral surface of the guide member 6. Additionally, the first seal member 7 is restricted from moving in the axial direction (i.e., toward the first reel body 11) by the bearing member 55.

The first seal member 7 contacts the outer peripheral surface of the first end 51 of the worm shaft 5. When described in detail, the first seal member 7 contacts the worm shaft 5 within the recess 511 provided on the first end 51 of the worm shaft 5. The first seal member 7 includes an annular lip 71 extending radially inward. The lip 71 contacts the outer peripheral surface of the worm shaft 5. The lip 71 extends radially inward and also extends axially toward the first reel body 11. The first seal member 7 is an elastic member and can be made of, for instance, rubber.

<Second Seal Member>

The second seal member 8 seals between the guide member 6 and the first reel body 11. The second seal member 8 is an example of a second sealing means. For example, the second seal member 8 can be an O-ring. The second seal member 8 is disposed in a recess 111 provided on the first sideplate 11a of the first reel body 11. The second seal member 8 is an elastic member, and can be made of, for instance, rubber.

<Engaging Member>

As shown in FIG. 4, the engaging member 9 is engaged with the helical groove 54 of the worm shaft 5. The engaging member 9 extends from the outside of the guide member 6 to the inside of the guide member 6 through the window 61. The engaging member 9 includes a shaft part 91 and an engaging pawl part 92. The shaft part 91 has a substantially columnar shape. The engaging pawl part 92 is engaged with the helical groove 54. The shaft part 91 and the engaging pawl part 92 are integrally provided.

<Slide Member>

The slide member 10 slides along the worm shaft 5. When described in detail, the slide member 10 reciprocates along the worm shaft 5. The slide member 10 is guided by the guide member 6. The slide member 10 is provided with a first through hole 101 and a second through hole 102.

The first through hole 101 is a hole for accommodating the engaging member 9. The first through hole 101 has a circular cross section. The first through hole 101 is provided with a female threaded part 1011 on at least part of its inner peripheral surface. The first through hole 101 communicates with the second through hole 102.

The second through hole 102 extends along the worm shaft 5. The guide member 6 penetrates the second through hole 102. The inner peripheral surface of the second through hole 102 contacts the outer peripheral surface of the guide member 6. With this construction, the slide member 10 is guided by the guide member 6. It should be noted that the second through hole 102 has a circular cross section.

Figure 5:
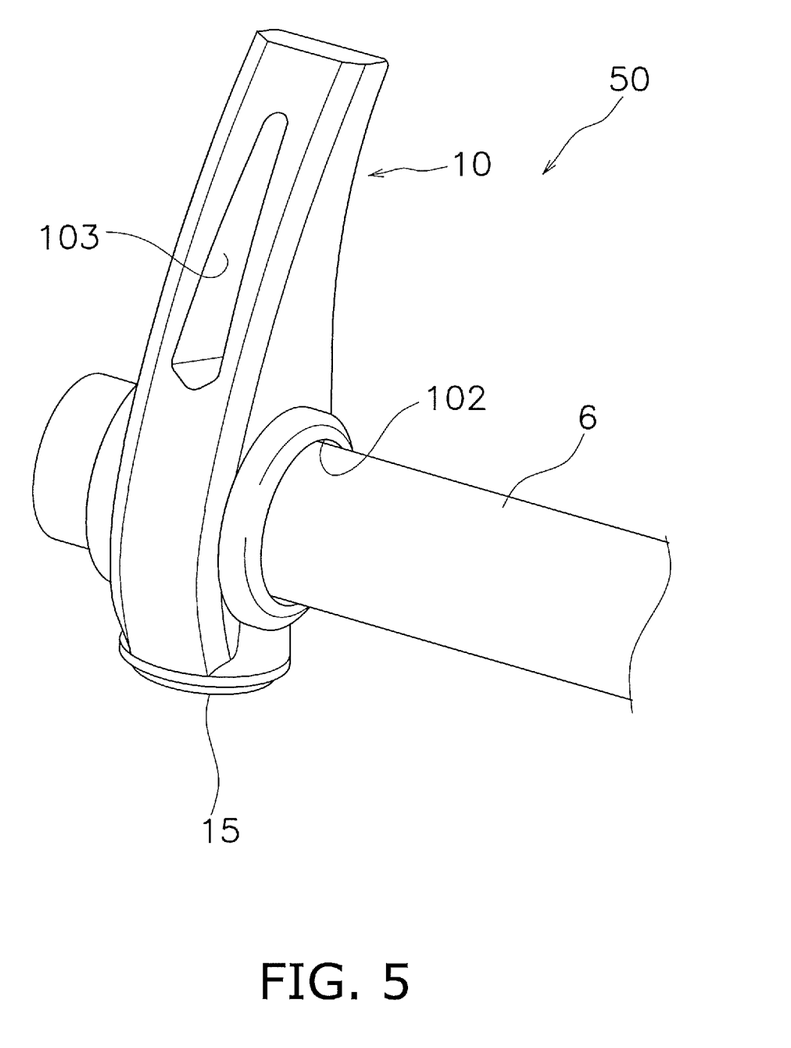
FIG. 5 is a perspective view of the level wind mechanism.

As shown in FIG. 5, the slide member 10 includes a fishing line guide part 103 for guiding the fishing line. The fishing line guide part 103 is an example of a fishing line guiding means. The fishing line extends forward from the spool 4 through the fishing line guide part 103. It should be noted that the fishing line guide part 103 is a through hole penetrating the slide member 10 and has a vertically elongated shape.

As shown in FIG. 4, the plug member 15 includes a plug body 151 and a holding part 152. The plug body 151 covers one end of the first through hole 101. The holding part 152 has a cylindrical shape and extends from the plug body 151. The holding part 152 is accommodated in the first through hole 101. Additionally, the holding part 152 is disposed between the inner peripheral surface of the first through hole 101 and the outer peripheral surface of the engaging member 9. When described in detail, the holding part 152 is disposed between the inner peripheral surface of the first through hole 101 and the outer peripheral surface of the shaft part 91. The holding part 152 holds the engaging member 9 such that the engaging member 9 is slidable and rotatable relatively to the holding part 152.

The shaft part 91 of the engaging member 9 is accommodated in the holding part 152. The inner diameter of the holding part 152 has approximately the same dimension as the outer diameter of the shaft part 91 of the engaging member 9. When described in detail, the outer diameter of the shaft part 91 is smaller than the inner diameter of the holding part 152 whereby the shaft part 91 of the engaging member 9 becomes rotatable about its axis within the holding part 152.

The holding part 152 is provided with a male threaded part 153 on at least part of its outer peripheral surface. The male threaded part 153 is screwed into the female threaded part 1011 provided on the inner peripheral surface of the first through hole 101. In other words, the holding part 152 holds the engaging member 9 and is fixed to the slide member 10. As apparent in light of FIG. 4, the outer lateral surface of the plug member 15 smoothly continues to that of the slide member 10.

Next, an action of the level wind mechanism 50 constructed as described above will be explained.

First, when the handle 2 is rotated, the worm shaft 5 is rotated through the drive shaft 31, the first gear 34 and the second gear 35. In conjunction with the rotation of the worm shaft 5, the engaging member 9 is reciprocated along the worm shaft 5. The engaging member 9 is held by the plug member 15, and the plug member 15 is fixed to the slide member 10. Hence, the slide member 10 is also reciprocated together with the engaging member 9 along the worm shaft 5. As a result, the fishing line is uniformly wound onto the spool 4 and is guided by the fishing line guide part 103 of the slide member 10.

<Features>

The level wind mechanism 50 according to the present preferred embodiment has the following features.

The level wind mechanism 50 according to the aforementioned preferred embodiment includes the worm shaft 5, the guide member 6 and the first seal member 7. The worm shaft 5 includes the first end 51, the second end 52, the shaft body 53 and the helical groove 54. The first end 51 is disposed on the same side of the reel unit 1 as the first reel body 11. The second end 52 is disposed on the same side of the reel unit 1 as the second reel body 12. The shaft body 53 extends between the first end 51 and the second end 52. The helical groove 54 is provided on the shaft body 53. The guide member 6 is disposed outside the worm shaft 5 in the radial direction of the worm shaft 5. The guide member 6 has a tubular shape and extends between the first reel body 11 and the second reel body 12. The first seal member 7 seals between the first end 51 of the worm shaft 5 and the guide member 6.

According to this construction, the first seal member 7 seals between the first end 51 of the worm shaft 5 and the guide member 6. Hence, it is possible to inhibit intrusion of water into the first reel body 11 through the gap between the worm shaft 5 and the guide member 6. Thus, the first seal member 7 is an example of a first sealing means for sealing out moisture from the level wind mechanism.

<Modifications>

One preferred embodiment of the present disclosure has been explained above. However, the present disclosure is not limited to the above, and a variety of changes can be made without departing from the scope of the present disclosure. For example, in the aforementioned preferred embodiment, the worm shaft 5 is provided with the recess 511 on the first end 51. However, the worm shaft 5 need not be provided with the recess 511.

Additionally, in the aforementioned preferred embodiment, the lip seal is used as the first seal member 7. However, the construction of the first seal member 7 is not particularly limited to this. For example, magnetic fluid or so forth can be used as the first seal member 7. Alternatively, a labyrinth structure processed with a waterproof treatment can be used as the first seal member 7. With such a construction, the first seal member 7 does not directly contact the worm shaft 5. Hence, the worm shaft 5 can be rotated with a light force. Likewise, the second seal member 8 is not limited to the O-ring in the aforementioned preferred embodiment. Magnetic fluid or so forth can be used as the second seal member 8. Alternatively, a labyrinth structure processed with a waterproof treatment can be used as the second seal member 8.

What is claimed is:

1. A level wind mechanism for a dual-bearing reel including a first reel body and a second reel body, the level wind mechanism comprising:
   a worm shaft including a first end, a second end, a shaft body and a helical groove, the first end being on the same side as the first reel body, the second end being on the same side as the second reel body, the shaft body extending between the first end and the second end, the helical groove being on the shaft body;
   a guide member having a tubular shape, the guide member being outside the worm shaft in a radial direction from a rotational axis of the worm shaft, the guide member extending between the first reel body and the second reel body;
   a bearing member configured to support the first end of the worm shaft by the first reel body, and
   a first seal member sealing between the first end of the worm shaft and the guide member, the first seal member disposed between the helical groove and the bearing member in an axial direction along the rotational axis of the worm shaft.

2. The level wind mechanism according to claim 1, wherein the first seal member is an elastic member including a lip, the lip contacting an outer peripheral surface of the worm shaft.

3. The level wind mechanism according to claim 1, further comprising:
   a second seal member sealing between the guide member and the first reel body.

4. The level wind mechanism according to claim 3, wherein the second seal member is an O-ring.

5. The level wind mechanism according to claim 3, wherein the second seal member includes a magnetic fluid.

6. The level wind mechanism according to claim 3, wherein the second seal member includes a labyrinth structure processed with a waterproof treatment.

7. The level wind mechanism according to claim 1, wherein
   the worm shaft further includes a recess on the first end of the worm shaft, the recess having an annular shape, the recess extending in a circumferential direction of the worm shaft, and
   the first seal member contacts the worm shaft within the recess.

8. The level wind mechanism according to claim 1, wherein the first seal member includes a magnetic fluid.

9. The level wind mechanism according to claim 1, wherein the first seal member includes a labyrinth structure processed with a waterproof treatment.

10. A dual-bearing reel, comprising:
    a reel unit including a first reel body and a second reel body;
    a handle attached to the first reel body;
    a spool disposed between the first reel body and the second reel body;
    a transmission disposed inside the first reel body, the transmission to transmit a rotation of the handle to the spool;
    a worm shaft including a first end, a second end, a shaft body and a helical groove, the first end being on the same side as the first reel body, the second end being on the same side as the second reel body, the shaft body extending between the first end and the second end, the helical groove being on the shaft body;
    a guide member having a tubular shape, the guide member being outside the worm shaft in a radial direction from a rotational axis of the worm shaft, the guide member extending between the first reel body and the second reel body;
    a bearing member configured to support the first end of the worm shaft by the first reel body, and
    a first seal member sealing between the first end of the worm shaft and the guide member, the first seal member disposed between the helical groove and the bearing member in an axial direction along the rotational axis of the worm shaft.

11. The dual-bearing reel according to claim 10, wherein the first seal member is an elastic member including a lip, the lip contacting an outer peripheral surface of the worm shaft.

12. The dual-bearing reel according to claim 10, further comprising:
    a second seal member sealing between the guide member and the first reel body.

13. The dual-bearing reel according to claim 12, wherein the second seal member is an O-ring.

14. The dual-bearing reel according to claim 12, wherein the second seal member includes a magnetic fluid.

15. The dual-bearing reel according to claim 12, wherein the second seal member includes a labyrinth structure processed with a waterproof treatment.

16. The dual-bearing reel according to claim 10, wherein
the worm shaft further includes a recess on the first end of
the worm shaft, the recess having an annular shape, the
recess extending in a circumferential direction of the
worm shaft, and
the first seal member contacts the worm shaft within the
recess.

17. The dual-bearing reel according to claim 10, wherein
the first seal member includes a magnetic fluid.

18. The dual-bearing reel according to claim 10, wherein
the first seal member includes a labyrinth structure processed with a waterproof treatment.

* * * * *